Jan. 9, 1968    J. HALLER    3,362,762
ROLLER BEARING ASSEMBLY WITH ROLLER-ENGAGING SPACERS
Filed Aug. 18, 1965
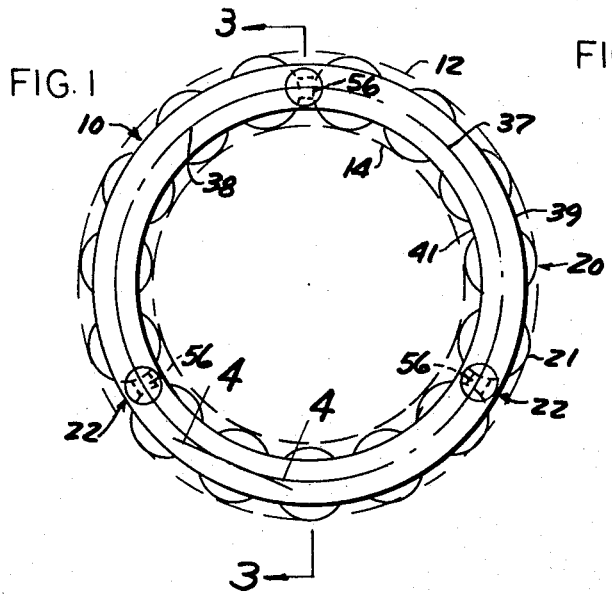
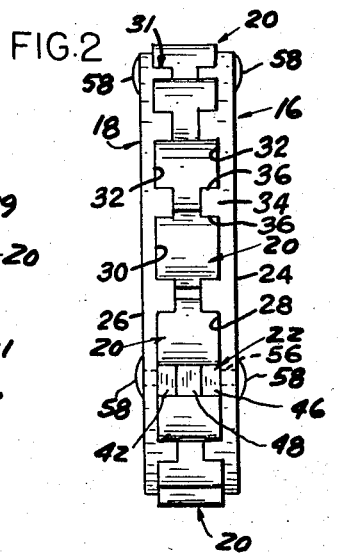
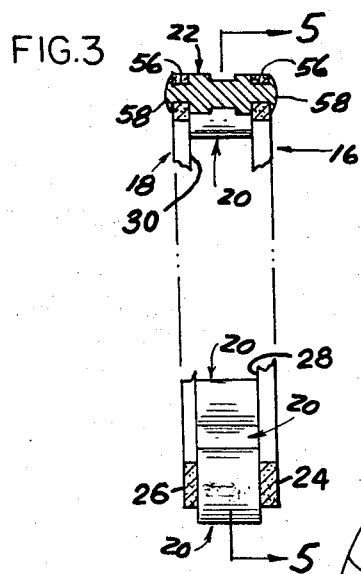
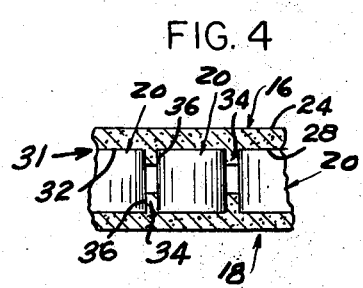
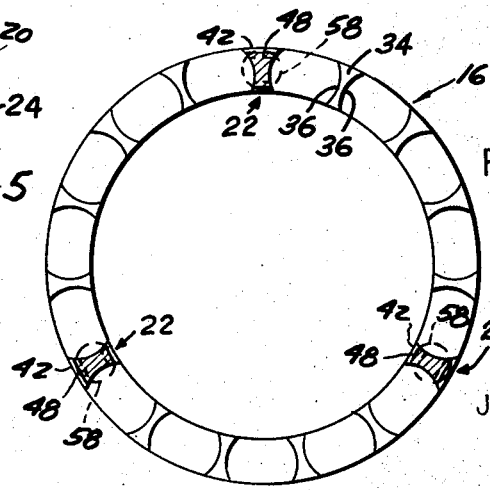
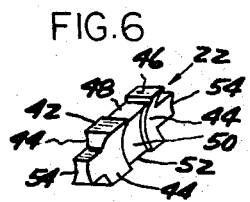
INVENTOR
JOHN HALLER
BY Barthel & Bugbee
ATTORNEYS

United States Patent Office 3,362,762
Patented Jan. 9, 1968

3,362,762
ROLLER BEARING ASSEMBLY WITH ROLLER-ENGAGING SPACERS
John Haller, Northville, Mich., assignor to Federal-Mogul Corporation, Detroit, Mich., a corporation of Michigan
Filed Aug. 18, 1965, Ser. No. 480,660
3 Claims. (Cl. 308—217)

ABSTRACT OF THE DISCLOSURE

This roller bearing assembly has spaced parallel annular retainers of molded sintered powdered material have outer and inner peripheries disposed coaxial with one another are provided on their facing surfaces with circumferentially-spaced recesses rotatably receiving the plain opposite ends of the bearing rollers. The recesses have generally cylindrical side walls receiving bearing engagement by the rollers as well as spacing them circumferentially, the side walls being cut away marginally adjacent said retainer peripheries to provide openings through which the peripheries of the rollers project radially above and below the annular retainers. The latter have certain intervening side walls removed between adjacent recesses and are held together by spacing members also formed of sintered powdered material and of capstan-shaped cross-section mounted in the gaps formed by such side wall removal and with the ends of the spacing members seated in circumferentially-spaced aligned holes in the annular retainers and upset or enlarged to retain these above-named components in assembly.

---

The opposite ends of the spacing members are likewise of non-circular cross-section and fit into corresponding circular holes in the retainers so as to prevent rocking or rotation of the spacers during operation.

In my co-pending application, Ser. No. 480,643 filed August 18, 1965, for Roller Bearing Assembly, I have disclosed and claimed a roller bearing assembly employing a pair of annular roller retainers having circumferentially-spaced recesses of cut-away cylindrical shape rotatably receiving the opposite ends of plain solid steel rollers projecting above and below the cut-away or incompletely-cylindrical recesses and held together by approximately W-shaped spring clips or retainer holders. The present invention differs from that of my said co-pending application by providing, instead of the spring clips, spacing members extending between and seated at their opposite ends in circumferentially-spaced aligned holes in the annular retainers and having concave cylindrical side surfaces which receive bearing engagement from the adjacent bearing rollers. The use of such spacing members is especially valuable in roller bearing assemblies having elongated rollers. The present invention causes the spacing members not only to retain the bearing rollers in assembly but also to provide additional bearing engagement for the rollers and, when formed of sintered powdered material impregnated with lubricant, to effect additional lubrication of the rollers.

In the accompanying drawing:

FIGURE 1 is a side elevation of a roller bearing assembly, according to one form of the invention, with the conventional bearing races omitted for simplicity of disclosure but with the bearing roller paths indicated by dotted circles;

FIGURE 2 is an end elevation of the roller bearing assembly shown in FIGURE 1;

FIGURE 3 is a vertical cross-section taken along the line 3—3 in FIGURE 1, with the central portion omitted and indicated by dotted lines to simplify the disclosure;

FIGURE 4 is a fragmentary circumferential section taken along the arcuate line 4—4 in FIGURE 1;

FIGURE 5 is a vertical longitudinal section through the bearing assembly of FIGURES 1 to 4 inclusive, taken along the line 5—5 in FIGURE 3, but with the bearing rollers removed to show the cut-away or incompletely cylindrical bearing roller end recesses; and FIGURE 6 is a perspective view of one of the spacers before insertion in the correspondingly-shaped holes in the annular retainers.

Referring to the drawing in detail, FIGURE 1 shows a roller bearing assembly, generally designated 10, according to one form of the invention with the conventional outer and inner races omitted but with their annular surfaces constituting their roller paths indicated by the circles 12 and 14 respectively. The roller bearing assembly 10 includes a pair of annular bearing roller retainers 16 and 18 respectively disposed coaxial and in spaced parallel relationship. The retainers 16 and 18 are of similar construction except that they are so-called mirror opposites in that they are of right-hand and left-hand arrangement as appears more fully below. Arranged between and rollably supported by the annular roller retainers 16 and 18 are bearing rollers 20, preferably of solid steel, and having cylindrical outer surfaces 21 and flat plain opposite ends 23.

Also mounted at circumferentially-spaced locations around the peripheries of the annular discs 16 and 18 are retainer spacers or spacing rods 22. Three such spacing rods 22 are shown in FIGURE 1 but for heavy duty bearings a greater number may be employed. The retainer spacers or spacing rods 22 are of the unusual configuration shown in FIGURE 6 and are more fully described below.

Each of the right-hand and left-hand annular roller retainers 16 and 18 has a plain outer face 24 or 26 and a recessed inner face 28 or 30 respectively. Each of the recessed inner faces 28 and 30 is provided with an annular set 31 of circumferentially-spaced roller end recesses or seats 32 of incompletely cylindrical or cut-away cylindrical shape with interrupted side surfaces or arcuate shoulders 36 corresponding in diameter, with the necessary clearances, to the diameter of the cylindrical surfaces 21 of the rollers 20 and constituting the arcuate opposite sides of partition walls 34 of capstan-shaped cross-section. The circle 37 on which the centers 38 of the bearing end recesses or seats 32 are located in FIGURES 1 to 5 inclusive is disposed nearer the inner periphery or edge 39 so as to cause the rollers 20 to project to their maximum extent beyond that edge. Certain intervening partition walls 34 between adjacent recesses 32 have been removed (FIGURE 2) and the spacers 22 mounted in the gaps thus provided by such removal.

The circle 37 on which the centers 38 of the bearing end recesses or seats 32 are located is for convenience located midway between the outer and inner peripheries 39 and 41 respectively, but it will be understood that this circular line of centers 37 may be located nearer the outer periphery 39 or nearer the inner periphery 41 to provide adequate clearance for the retainers 16 and 18 when their rollers 20 roll in annular grooves in conventional outer or inner races (not shown). Such locations of the circular line of centers 37 are shown in my above-identified co-pending application.

Each spacer 22 (FIGURE 6) includes an enlarged intermediate portion 42 of approximately capstan-shaped cross-section with partly cylindrical opposite side surfaces 44 and cylindrical outer and inner surfaces 46 and 48. The partly cylindrical side surfaces 44 are provided with curvatures substantially equal to the curvatures of the outer cylindrical surface 21 of the roller 20, with necessary clearances, whereas the outer and inner cylindrical surfaces 46 and 48 are preferably of approximately the same radii of curvature as the outer and inner peripheries 41 and 39 of the annular bearing roller retainers 16 and 18. The intermediate portion 42 is interrupted in its middle by relief portions or grooves 48, 50 and 52 respectively so that during operation the cylindrical surfaces 21 of the rollers 20 will roll against the side surfaces 44 and not against the midportions thereof. Each spacer 22 terminates in reduced-size end portions 54 likewise preferably of capstan-shaped cross-section and fitted into correspondingly-shaped holes 56 formed in the annular bearing roller retainers 16 and 18 at circumferentially-spaced locations therearound. As will subsequently appear below during the discussion of the assembly of the roller bearing assembly 10, the reduced size portions 54 at the opposite ends of the spacers 22 are upset to provide consequently enlarged dome-like opposite ends 58 during assembly.

The annular retainers 16 and 18 are formed by conventional pressing methods in conventional briquetting presses between dies of opposite configuration to the configuration of the retainers 16 and 18. The lower die preferably contains the die cavity for producing an upwardly-facing retainer 16 or 18 whereas the upper die constitutes the punch secured to the movable press platen and has individual circumferentially-spaced punch portions or projections for producing the roller end recesses 40 and the circumferentially-spaced holes 56 of capstan-shaped outline for receiving the reduced size ends 54 of the spacers 22. A powdered metal of suitable size and composition is placed in the die cavity while the press platen is in its raised position. The descent of the press platen and the punch attached to it compresses the powdered metal and forms it into a briquette or "green" pressing corresponding in shape to the annular retainer 16 or 18.

The platen and punch are then retracted upward and the briquette or pressing is then ejected, placed in a sintering oven and sintered according to procedures well known to those skilled in the art of powder metallurgy. The pressing procedures vary with the porosity and density desired. The powdered material employed may be powdered iron, powdered bronze, or may be a suitable powdered synthetic plastic, such as the polymeric amide plastic known commercially as nylon. The sintered powdered metal retainers 16 and 18 may then, if desired, be impregnated with a suitable lubricant such as lubricating oil by conventional methods, for example, by immersing them in a closed container of lubricant which is then evacuated to cause the lubricant to penetrate the pores of the sintered powdered metal retainers 16 or 18, as the case may be.

The annular bearing retainer spacers 22 are also formed by conventional pressing methods in conventional briquetting presses between dies of opposite configuration to the configuration of the spacers 22 and molded of sintered powdered material, such as powdered iron, bronze or nylon in the manner described above. The thus molded spacers 22 are also sintered in the manner described above to permanently harden them, and are also then impregnated with lubricant in the same manner.

In the assembly of the roller bearing assembly 10, an inner race (not shown) containing an annular roller groove, the bottom of which forms the roller path 14 and one of the annular roller retainers 16 or 18 are placed in concentric relationship upon a horizontal support such as a table or fixture, with the recesses 32 facing upward and with the requisite number of spacers 22 inserted in the holes 56 thereof and the inserted ends 54 upset rivet-like to form the enlarged dome-like end portions 58 (FIGURE 3). The opposite ends 54 of the spacers 22 are temporarily left in their unenlarged condition.

A suitable number of rollers 20 constituting a set are then pushed horizontally into the roller groove of the inner race until their ends 23 coincide with their respective recesses 32, whereupon they are dropped into these recesses 32 while their inner edge portions are within the roller groove of the inner race, the bottom of which constitutes the inner roller path 14. The other annular roller retainer 18 or 16 is then superimposed upon the free ends 23 of the upwardly-projecting rollers 20 while at the same time the holes 56 therein are aligned with the correspondingly-shaped free upper ends 54 of the spacers 22. The other annular roller retainer 18 or 16 is then pushed downward so as to cause the free rollers ends 23 to enter the aligned roller end recesses 32 and at the same time cause the free ends 54 of the upwardly-projecting spacers 22 to enter the holes 56 therein and pass upward therethrough with a portion projecting thereabove. The projecting portions are then subjected to upsetting operations to enlarge them and form the dome-shaped enlargements 58. This action locks the various components of the roller bearing assembly 10 together in a single unit. The conventional outer race (not shown) is then dropped over the outer edges of the rollers 20 with its inner annular surface occupying the position of the roller path 12, and the assembly is then ready for use as an anti-friction bearing unit.

If, on the other hand, the conventional outer race has the annular bearing roller groove in it, the assembly operations as regards the outer and inner races are reversed, but otherwise the procedure is similar to that described above. The conventional outer race (not shown) is then dropped over the outer edges of the rollers 20 with its inner annular surface occupying the position of the roller path 12, and the assembly is then ready for use as an anti-friction bearing unit.

What I claim is:
1. A roller bearing assembly, comprising
a pair of annular roller retainers of sintered powdered material disposed coaxial with one another and having outer and inner peripheries and facing surfaces disposed in axially-spaced parallel relationship,
the facing surface of each retainer having therein a set of bearing roller end recesses with side walls of generally circular cross-section disposed in circumferentially-spaced relationship with their centers disposed on a circle coaxial with said retainers,
bearing rollers mounted between said retainers with their opposite end portions rotatably mounted in said recesses in mating bearing engagement with said side walls,
and spacers engaging said retainers and extending therebetween for holding said retainers and said bearing rollers in assembly with one another,
said spacers having bearing surfaces of partially cylindrical configuration disposed in bearing engagement with certain of said rollers,
said side walls of said recesses being cut away marginally adjacent at least one of said peripheries to provide peripheral openings therethrough and the marginal portions of said rollers projecting through said openings, certain intervening side walls between adjacent recesses being removed and said spacers being mounted in the gaps thus provided by such removal of said intervening side walls.

2. A roller bearing assembly, according to claim 1, wherein said side walls form partitions between said end recesses which are integral with said roller retainers and wherein said spacers mounted in said gaps and said partitions are spaced apart from one another circumferentially at substantially equal intervals.

3. A roller bearing assembly, according to claim 1, wherein said side walls of said recesses are also cut away marginally adjacent the other of said peripheries to provide peripheral openings therethrough, and wherein the marginal portions of said rollers project through the openings in said outer and inner peripheries.

References Cited

UNITED STATES PATENTS

| | | | |
|---|---|---|---|
| 502,025 | 7/1893 | Avery | 308—217 |
| 1,415,420 | 5/1922 | Weibull | 308—217 |
| 2,569,531 | 10/1951 | Kunzog. | |

FOREIGN PATENTS 390,338 10/1908 France.

MARTIN P. SCHWADRON, *Primary Examiner.*

FRANK SUSKO, *Examiner.*